(12) United States Patent
Chen et al.

(10) Patent No.: US 10,853,188 B2
(45) Date of Patent: Dec. 1, 2020

(54) SYSTEM AND METHOD FOR DATA RETENTION IN A DECENTRALIZED SYSTEM

(71) Applicant: EMC IP Holding Company LLC, Hopkinton, MA (US)

(72) Inventors: Si Chen, Shanghai (CN); Zhenzhen Lin, Shanghai (CN); Pengfei Wu, Shanghai (CN); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 16/395,399

(22) Filed: Apr. 26, 2019

(65) Prior Publication Data

US 2020/0341856 A1    Oct. 29, 2020

(51) Int. Cl.
*G06F 12/00* (2006.01)
*G06F 11/14* (2006.01)
*G06F 16/174* (2019.01)
*G06F 11/30* (2006.01)

(52) U.S. Cl.
CPC ...... *G06F 11/1453* (2013.01); *G06F 11/1425* (2013.01); *G06F 11/3034* (2013.01); *G06F 16/1748* (2019.01)

(58) Field of Classification Search
CPC ............. G06F 11/1453; G06F 11/1425; G06F 11/3034; G06F 16/1748
See application file for complete search history.

(56) References Cited

U.S. PATENT DOCUMENTS

| | | | |
|---|---|---|---|
| 10,108,634 B1* | 10/2018 | Pal | G06F 16/2365 |
| 2008/0307527 A1* | 12/2008 | Kaczmarski | G06F 16/122 726/24 |
| 2010/0281081 A1* | 11/2010 | Stager | G06F 9/5022 707/814 |
| 2018/0136862 A1* | 5/2018 | Rusenas | G06F 3/0605 |
| 2019/0179805 A1* | 6/2019 | Prahlad | G06Q 30/0206 |
| 2020/0117372 A1* | 4/2020 | Corey | G06F 3/067 |

* cited by examiner

*Primary Examiner* — John A Lane
(74) *Attorney, Agent, or Firm* — Chamberlain, Hrdlicka, White, Williams & Aughtry

(57) ABSTRACT

A node for use in a data management system includes a persistent storage and a data protection agent. The persistent storage stores data. The data protection agent makes an identification of a data protection strategy change event for the data; in response to the identification: makes a determination that the data protection strategy change event is a scale down event; in response to the determination: identifies a number of replicas of the data in other nodes that are in a predetermined state; makes a second determination that the number of the replicas of the data in the other nodes that are in the predetermined state exceeds a threshold specified by a data protection policy associated with the data protection strategy change event; and reduces the number of replicas that exceed the threshold to be less than the threshold in response to the second determination.

20 Claims, 17 Drawing Sheets

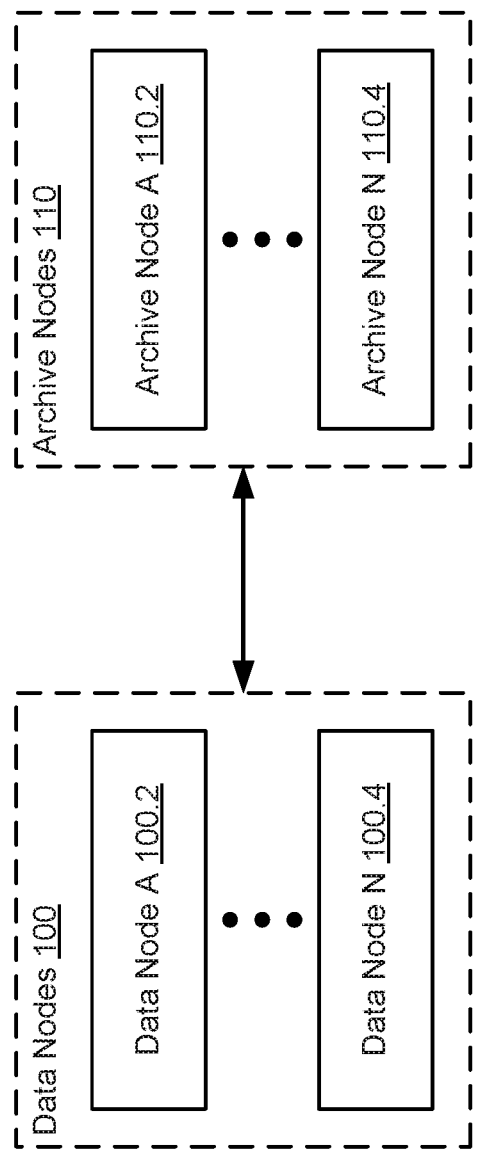
FIG. 1.1

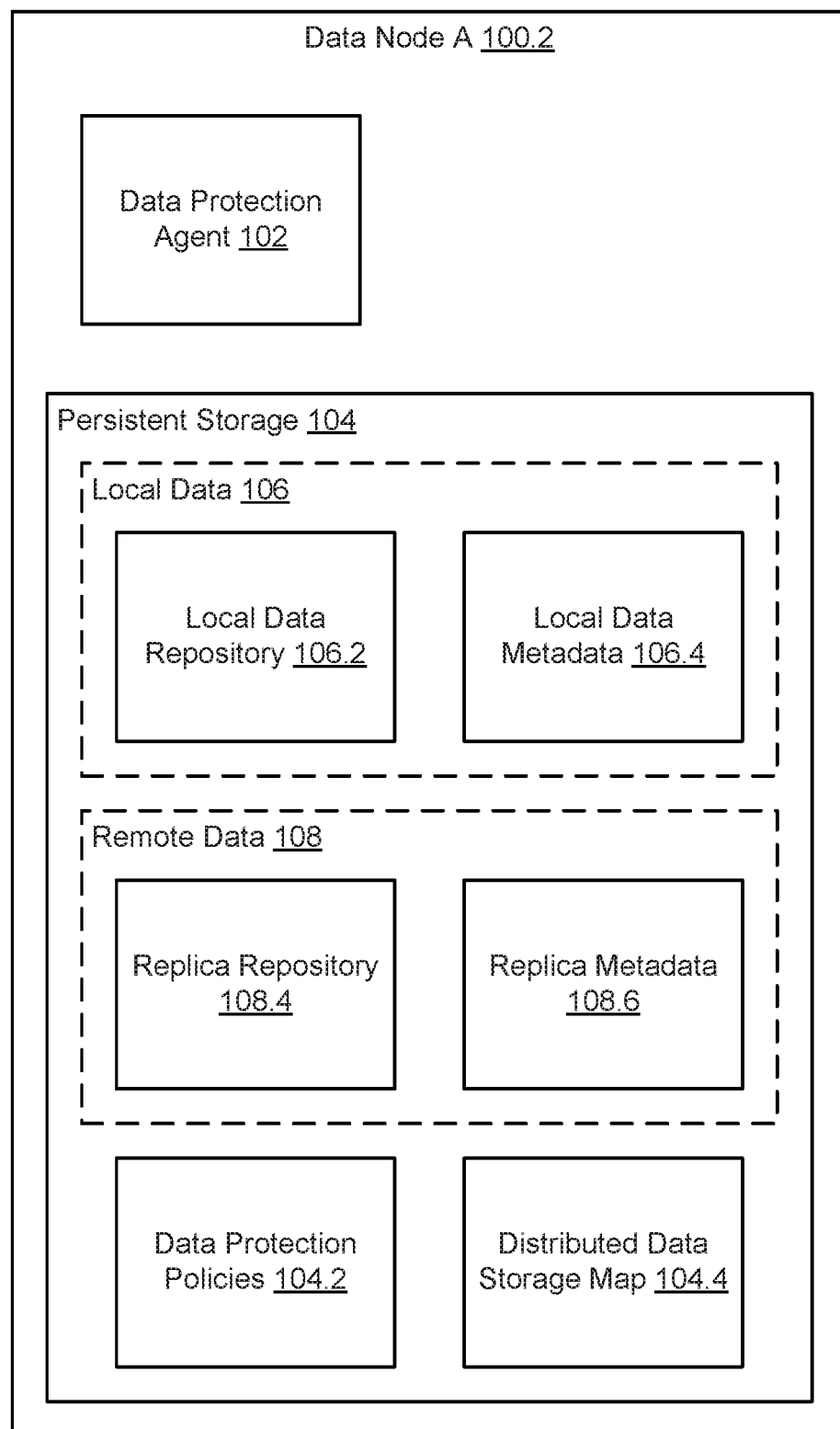
FIG. 1.2

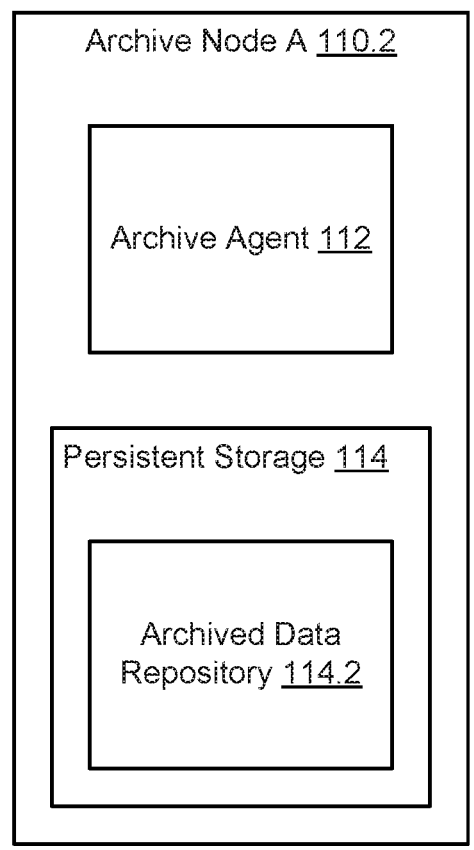
FIG. 1.3

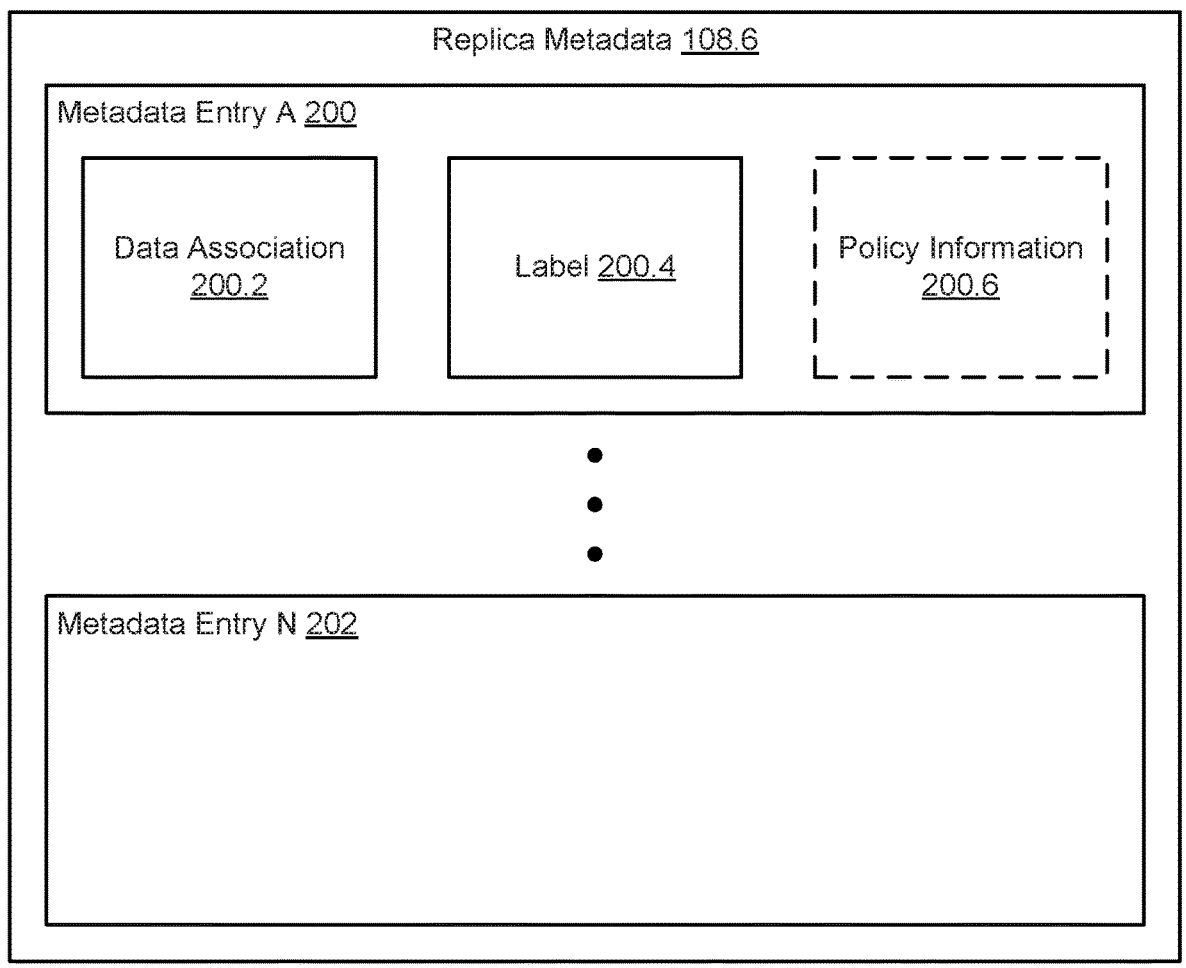
FIG. 2.1

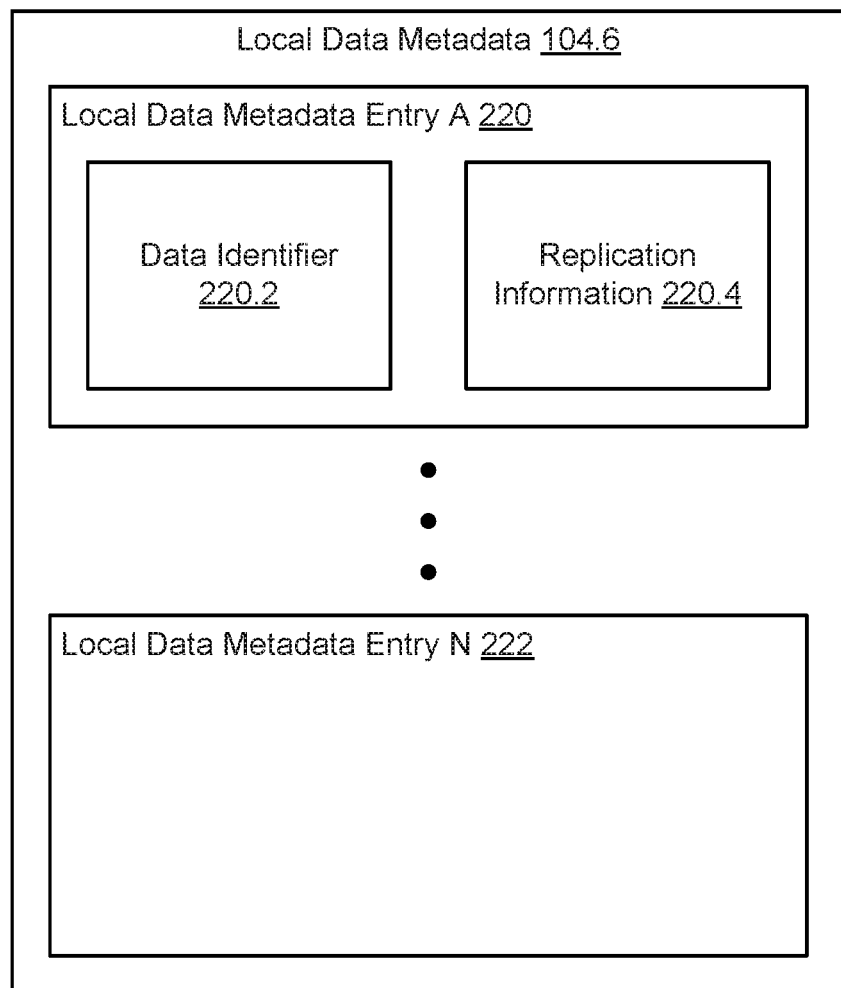
FIG. 2.2

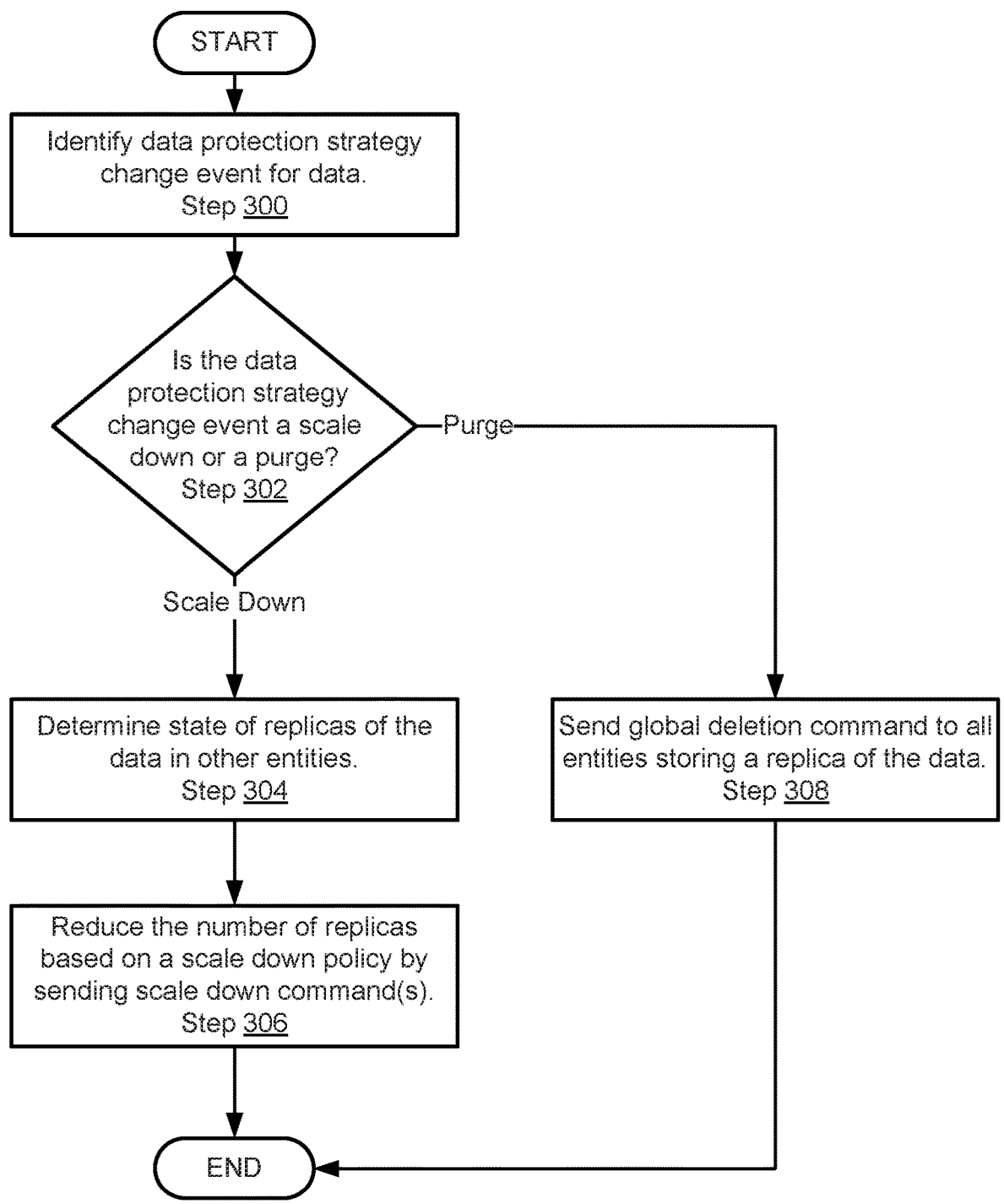
FIG. 3.1

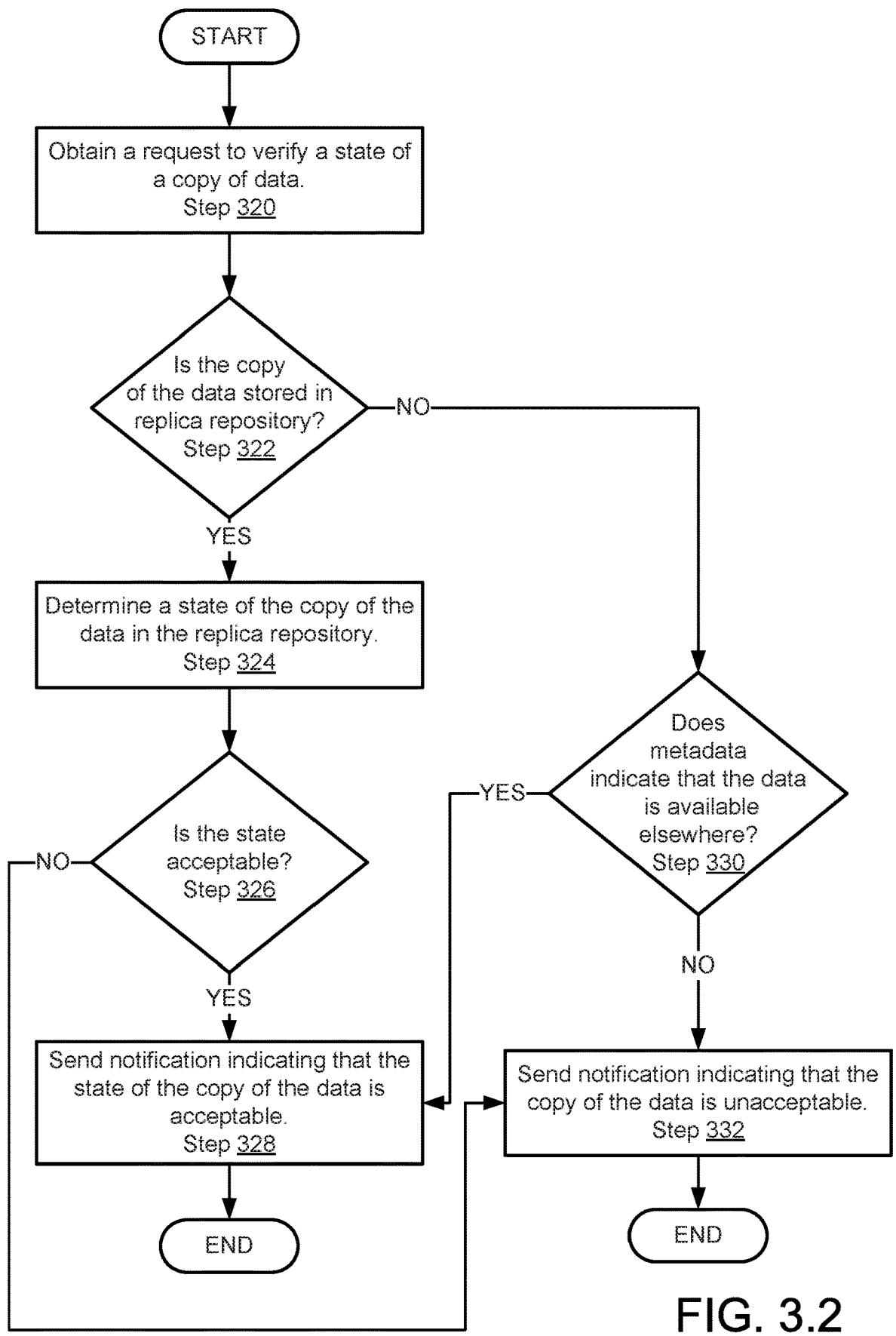
FIG. 3.2

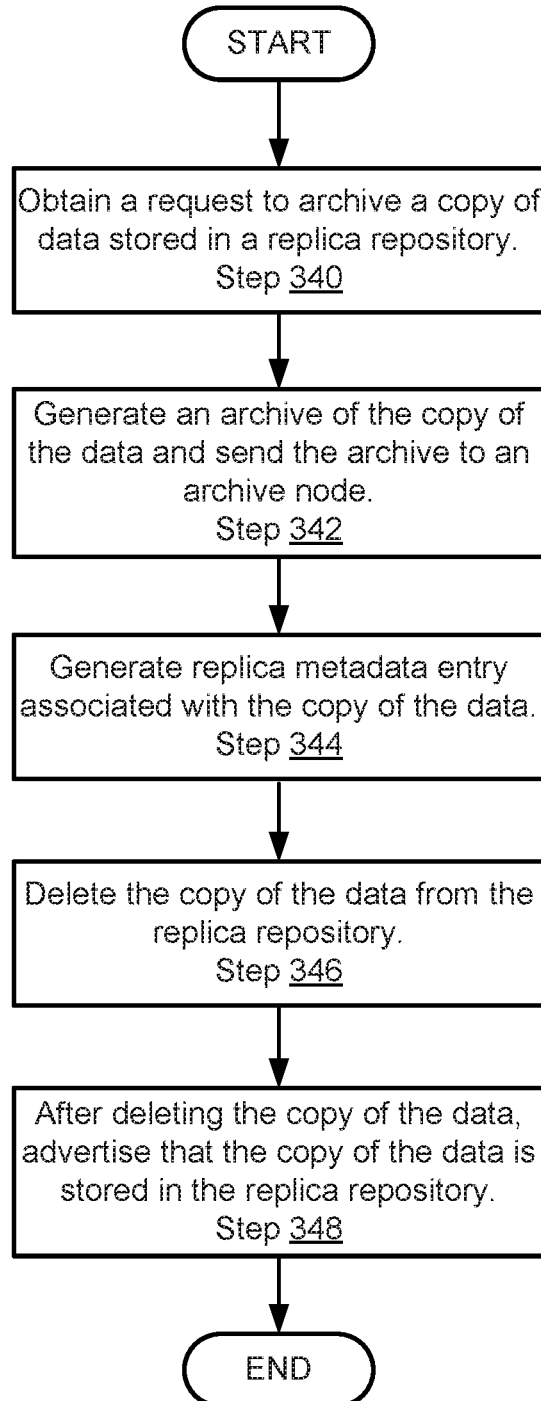
FIG. 3.3

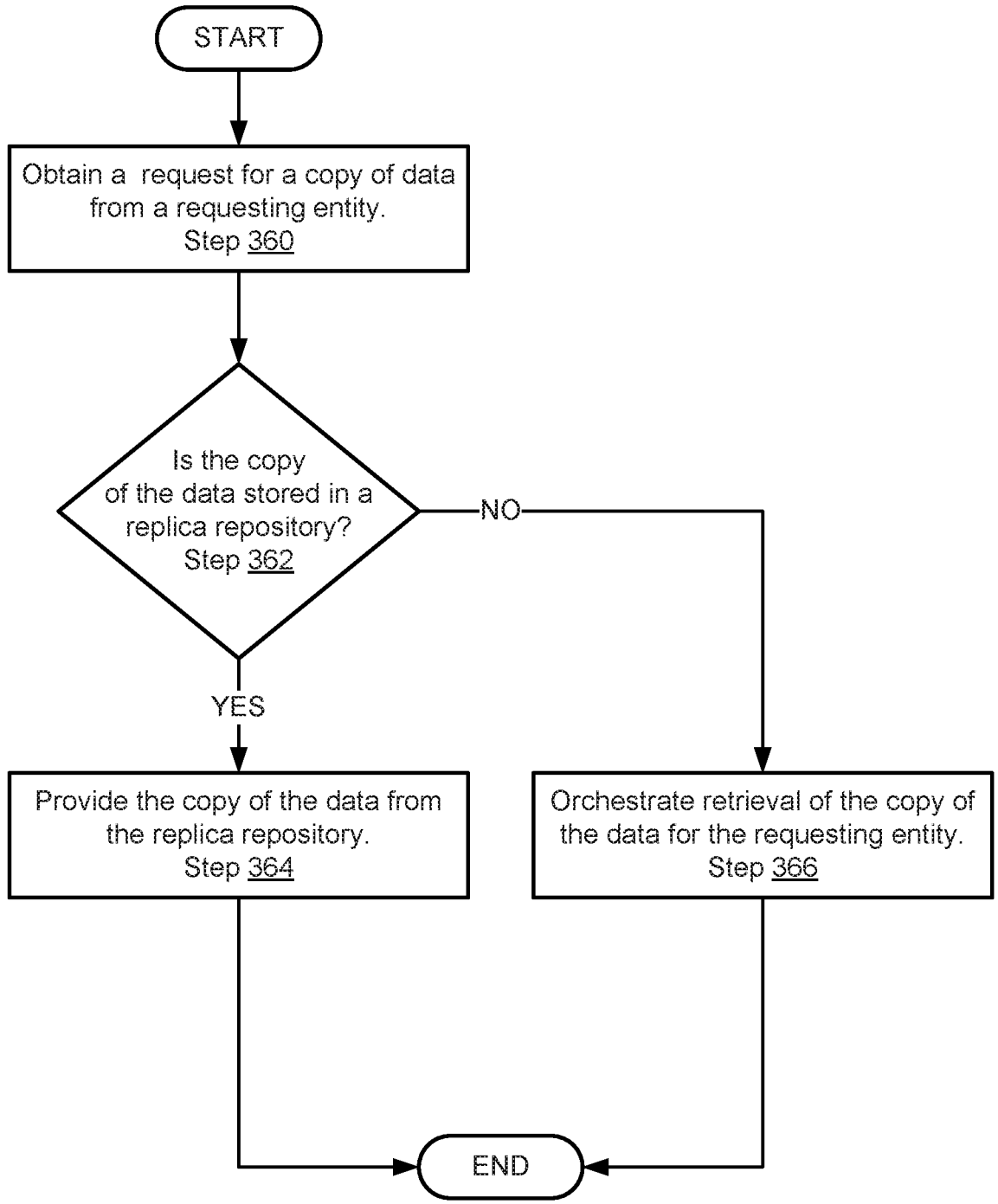
FIG. 3.4

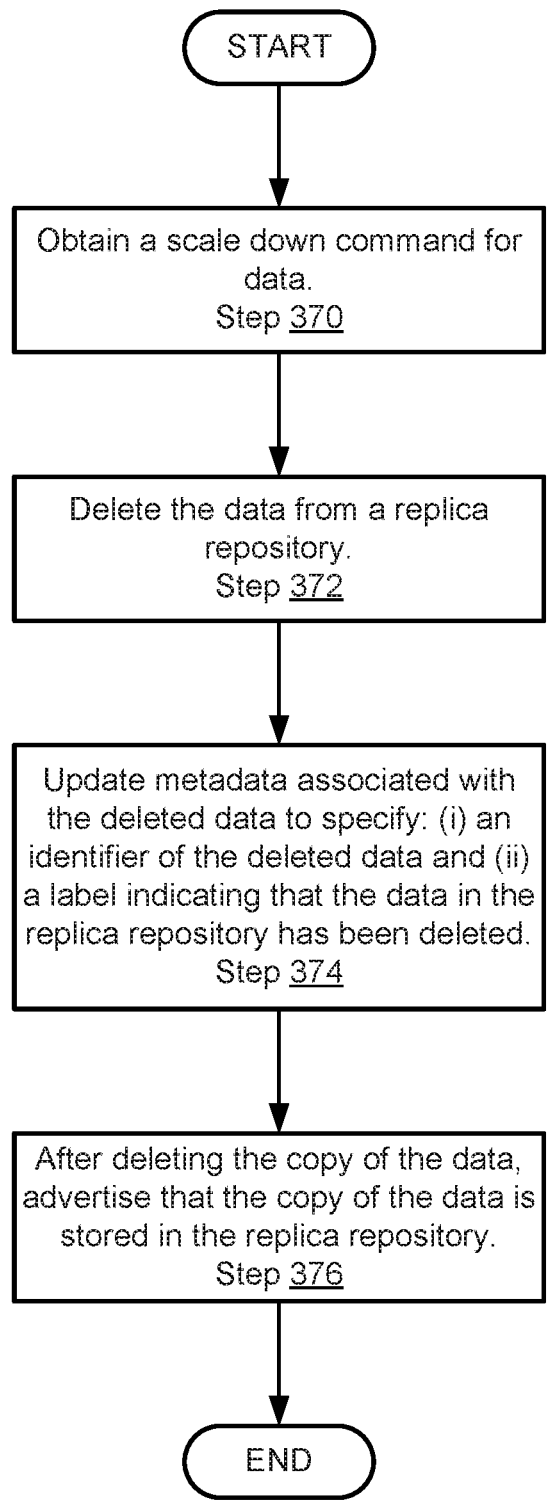
FIG. 3.5

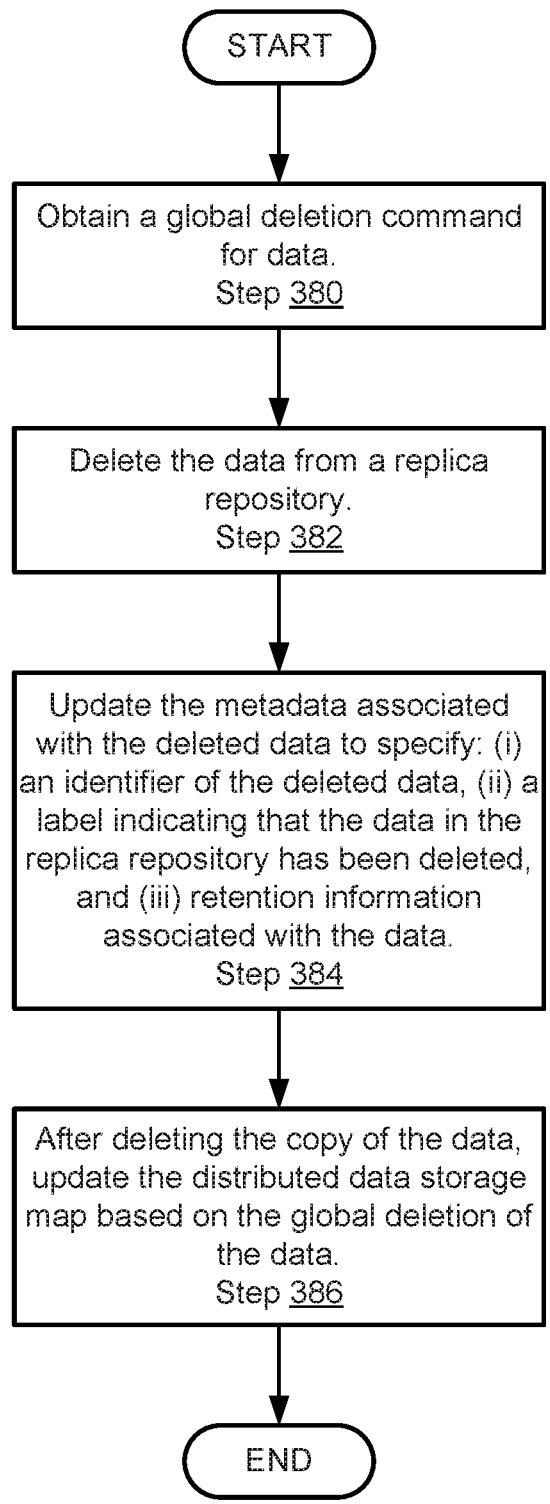
FIG. 3.6

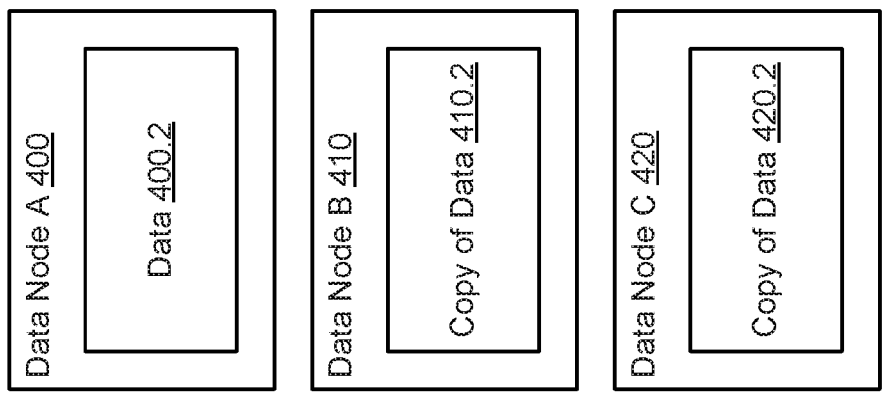
FIG. 4.1

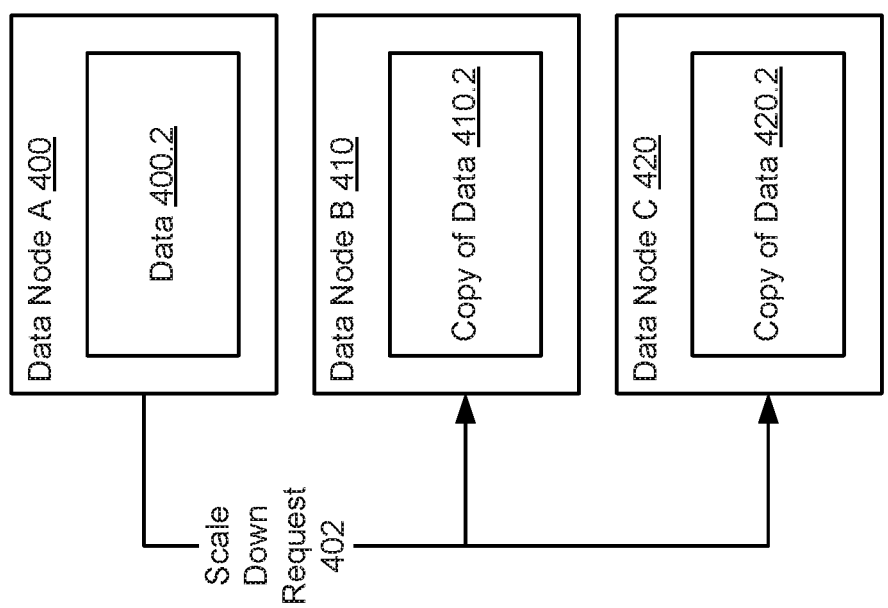
FIG. 4.2

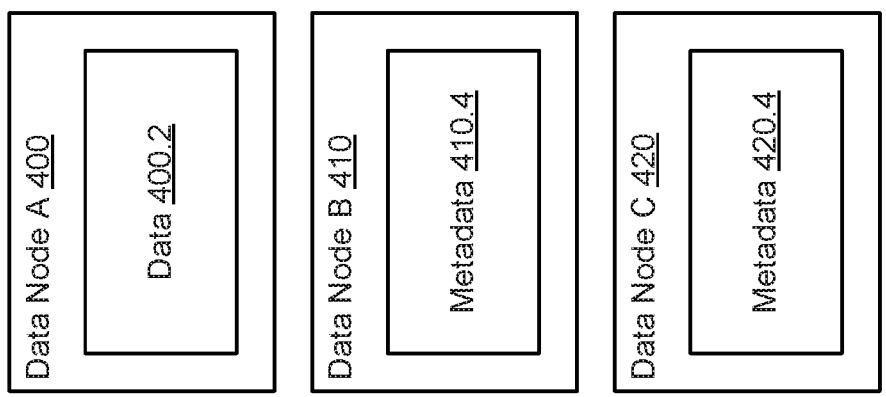
FIG. 4.3

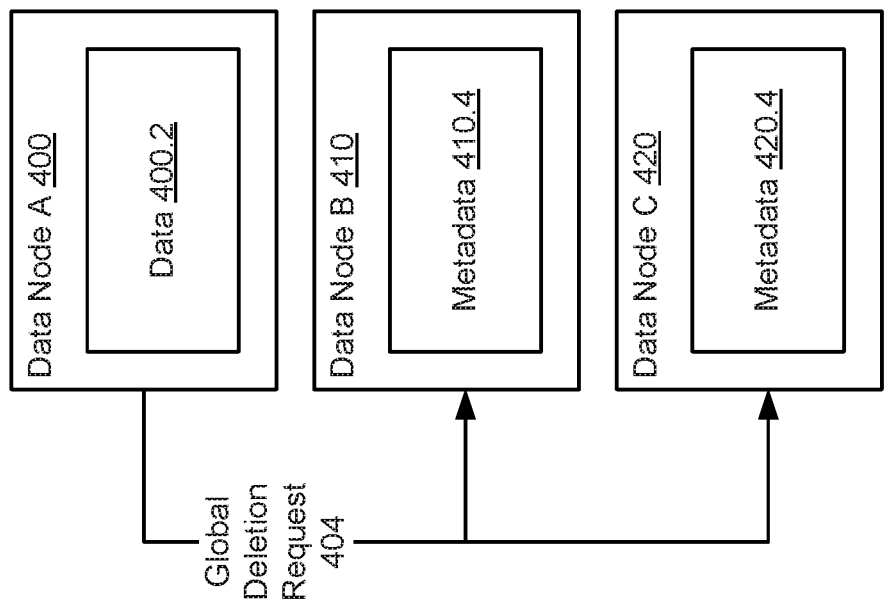

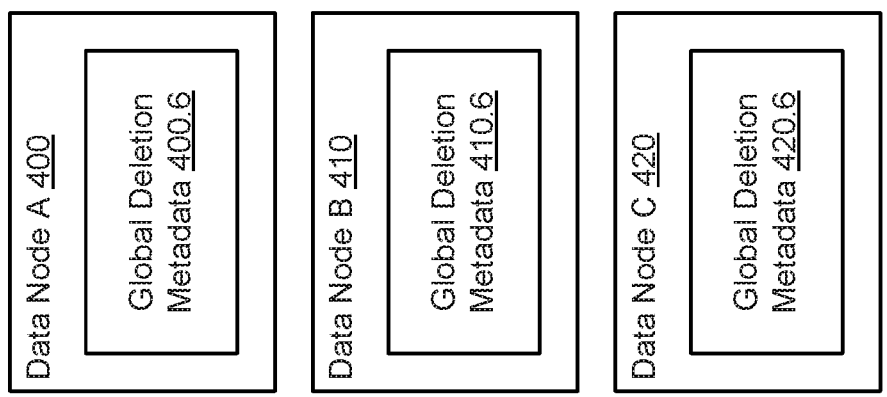
FIG. 4.5

SYSTEM AND METHOD FOR DATA RETENTION IN A DECENTRALIZED SYSTEM

BACKGROUND

Computing devices may store information. The information may reflect information entered by a user. Such information may be important to a user. For example, a user may type information into a database, may add data to a spreadsheet, or may draft emails. Each of these interactions between a user and a computing device may cause information important to a user to be stored in a computing device.

In a distributed computing environment, multiple computing devices may be operably connected to each other. To provide redundancy, copies of data may be stored in multiple computing devices to prevent failure of one of the computing devices from causing data loss.

SUMMARY

In one aspect, a node for use in a data management system in accordance with one or more embodiments of the invention includes a persistent storage and a data protection agent. The persistent storage stores data. The data protection agent makes an identification of a data protection strategy change event for the data; in response to the identification: makes a determination that the data protection strategy change event is a scale down event; in response to the determination: identifies a number of replicas of the data in other nodes that are in a predetermined state; makes a second determination that the number of the replicas of the data in the other nodes that are in the predetermined state exceeds a threshold specified by a data protection policy associated with the data protection strategy change event; and reduces the number of replicas that exceed the threshold to be less than the threshold in response to the second determination.

In one aspect, a method for managing a node in a data management system in accordance with one or more embodiments of the invention includes making an identification of a data protection strategy change event for data in a persistent storage of the node; in response to the identification: making a determination that the data protection strategy change event is a scale down event; in response to the determination: identifying a number of replicas of the data in other nodes that are in a predetermined state; making a second determination that the number of the replicas of the data in the other nodes that are in the predetermined state exceeds a threshold specified by a data protection policy associated with the data protection strategy change event; and reducing the number of replicas that exceed the threshold to be less than the threshold in response to the second determination.

In one aspect, a non-transitory computer readable medium in accordance with one or more embodiments of the invention includes computer readable program code, which when executed by a computer processor enables the computer processor to perform a method for managing a node in a data management system. The method includes making an identification of a data protection strategy change event for data in a persistent storage of the node; in response to the identification: making a determination that the data protection strategy change event is a scale down event; in response to the determination: identifying a number of replicas of the data in other nodes that are in a predetermined state; making a second determination that the number of the replicas of the data in the other nodes that are in the predetermined state exceeds a threshold specified by a data protection policy associated with the data protection strategy change event; and reducing the number of replicas that exceed the threshold to be less than the threshold in response to the second determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data node in accordance with one or more embodiments of the invention.

FIG. 1.3 shows a diagram of an archive node in accordance with one or more embodiments of the invention.

FIG. 2.1 shows a diagram of replica metadata in accordance with one or more embodiments of the invention.

FIG. 2.2 shows a diagram of local data metadata in accordance with one or more embodiments of the invention.

FIG. 3.1 shows a flowchart of a method of enforcing data protection policies in accordance with one or more embodiments of the invention.

FIG. 3.2 shows a flowchart of a method of responding to a data state verification request in accordance with one or more embodiments of the invention.

FIG. 3.3 shows a flowchart of a method of responding to a data archive request in accordance with one or more embodiments of the invention.

FIG. 3.4 shows a flowchart of a method of responding to a request for a copy of data in accordance with one or more embodiments of the invention.

FIG. 3.5 shows a flowchart of a method of responding to a scale down request in accordance with one or more embodiments of the invention.

FIG. 3.6 shows a flowchart of a method of responding to a global deletion request in accordance with one or more embodiments of the invention.

FIGS. 4.1-4.5 show diagrams of an example system at different points in time.

DETAILED DESCRIPTION

Figure 5:
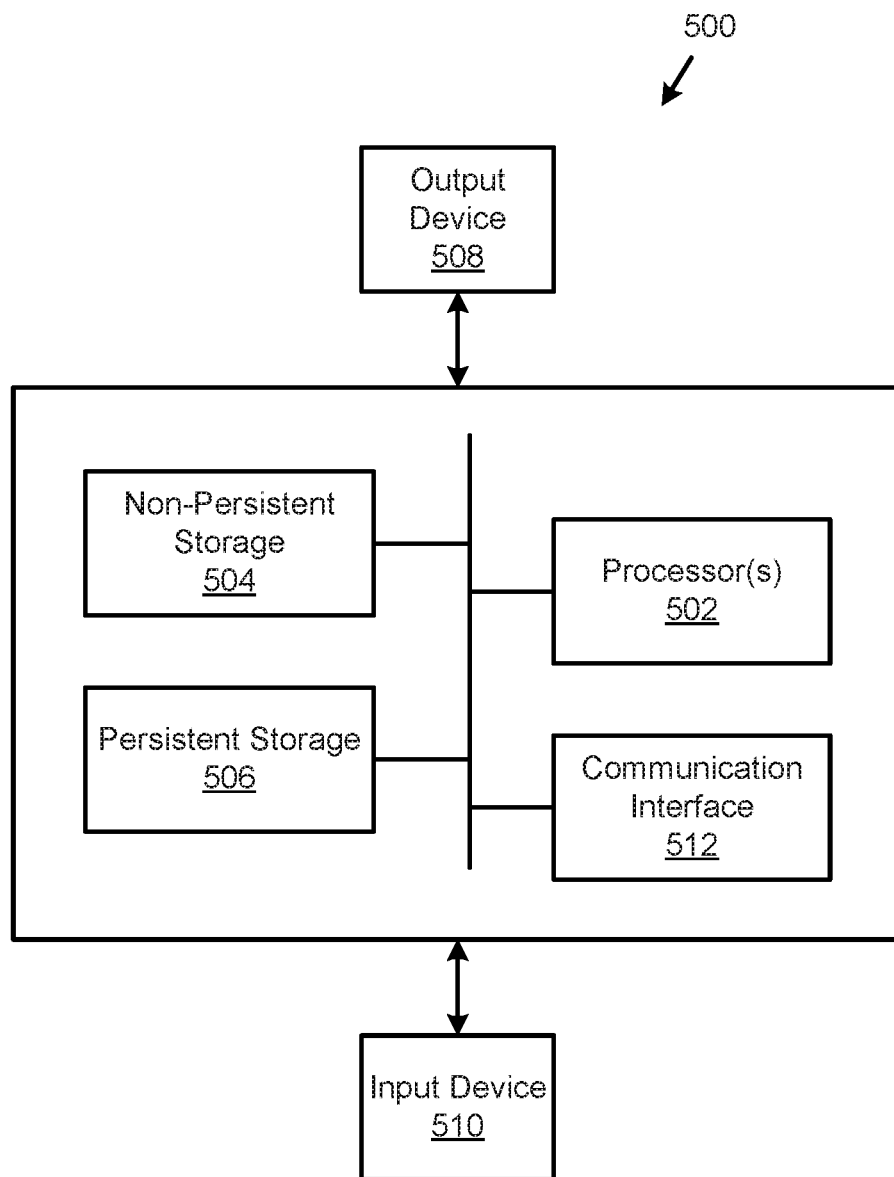
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection in a decentralized data storage system. A system in accordance with embodiments of the invention may include data nodes and/or archive nodes. The data nodes may redundantly store multiple copies of data for data integrity purposes.

In one or more embodiments of the invention, the data nodes enforce data protection policies that implement different data protection strategies over time. For example, a first data protection strategy may specify that multiple copies of data are to be stored across multiple data nodes for redundancy and/or availability purposes while a second data protection strategy may specify that only a single copy of data is to be stored. Different data protection strategies may be employed during different periods of time to tailor the quantity of computing resources utilized for data protection. Thus, the quantity of computing resources dedicated for data protection purposes may change as the importance of the data changes.

In one or more embodiments of the invention, the data nodes store different types of metadata related to the data protection strategies. As the data protection strategy changes, the contents of the metadata may change. The contents of the metadata may be to facilitate data protection strategy enforcement even when the connectivity of the connections between the data nodes becomes partially impaired. Thus, embodiments of the invention may provide a system for decentralized data protection that is network connectivity impairment tolerant.

FIG. 1.1 shows an example system in accordance with one or more embodiments of the invention. The system may be a decentralized data protection system. The system may include data nodes (100) that generate data and archive nodes (110) that store archived data that was generated by the data nodes (100) and/or other entities. To provide for a decentralized data protection system, the data nodes (100) may support an architecture that stores multiple copies of data generated by any of the data nodes (100) in multiple data nodes (100).

For example, the data nodes (100) may each follow a policy that requires three copies of data (or other numbers of copies) to be stored within the data nodes (100) at all points in time. By doing so, the decentralized data protection system may improve reliability of storing data when compared to only storing a single copy of data in the data nodes (100).

The policies employed by the data nodes (100) may require that different numbers of copies of data be stored across the data nodes (100) during different periods of time. For example, three copies may be required to be stored across the data nodes (100) during a first period of time, a single copy may be required to be stored across the data nodes (100) during a second period of time, and no copies of the data may be required to be stored across the data nodes (100) during a third period of time. Embodiments of the invention may provide efficient methods for ensuring compliance with these policies. By doing so, embodiments of the invention may provide a distributed data protection system that minimizes the computational requirements of storing data with high storage reliability.

Each component of the system of FIG. 1.1 may be operably connected via any combination of wired and wireless connections. However, the operable connections between each of the components may not be always available. For example, due to the network topology between each of the data nodes (e.g., 100.2, 100.4) and each of the archive nodes (e.g., 110.2, 110.4), each node may not always be connected to each of the other nodes at all times.

For example, consider a scenario in which each of the data nodes (100) are computing devices of automobiles and each of the archive nodes (110) are cloud resources connected to the Internet. Because of the wireless connections that operably interconnect the data nodes (100), any of the data nodes (100) may become temporarily unreachable with respect to any of the other data nodes (100) and/or any of the archive nodes (110).

Due to the changing topology of the nodes of the decentralized data protection system, embodiments of the invention may provide methodologies for verifying that a sufficient number of copies of data stored within the data nodes (100) to meet data protection policies of the decentralized data protection system at all points in time. To further explain aspects of embodiments of the invention, each component of the system of FIG. 1.1 is discussed below.

The data nodes (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data nodes (100) described in this application and/or all or a portion of the methods illustrated in FIGS. 3.1-3.6. The data nodes (100) may be other types of computing devices without departing from the invention. For additional details regarding computing devices, refer to FIG. 5.

In one or more embodiments of the invention, the data nodes (100) are distributed computing devices. A distributed computing device may refer to functionality provided by a logical device that utilizes the computing resources of one or more separate and/or distinct computing devices. For example, in one or more embodiments of the invention, the data nodes (100) may be distributed devices that include components distributed across any number of separate and/or distinct computing devices. In such a scenario, the functionality of the data nodes (100) may be performed by multiple different physical computing devices without departing from the invention. For example, the data nodes (100) may utilize virtualized computing resources of any number of physical computing devices to provide the functionality of the data nodes (100).

The data nodes (100) may implement data protection strategies for the decentralized data protection system. To implement the data protection strategies, the data nodes (100) may dynamically adjust their behavior as the requirements specified by the data protection strategies change over time. Such requirements may include, for example, a number of copies that must be stored across the data nodes (100), the content of metadata associated with the copies of the data that must be stored across the data nodes (100), and/or notifications that must be sent to various nodes of the data nodes (100) and/or the archive nodes (110).

By doing so, the decentralized data protection system may provide data redundancy and data archiving services even when nodes of the decentralized data protection system become unreachable due to changes in network topology. In environments where connectivity between the data nodes (100) and/or other entities is subject to change, the aforementioned data protection strategies performed by the data nodes (100) may improve the reliability of storing data in a distributed system and improve the efficiency of storing redundant copies of the data for data integrity purposes. For additional details regarding the data nodes (100), refer to FIG. 1.2.

The archive nodes (110) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the archive nodes (110) described in this application and/or all or a portion of the methods illustrated in FIGS. 3.1-3.6. The archive nodes (110) may be other types of computing devices without departing from the invention. For additional details regarding computing devices, refer to FIG. 5.

In one or more embodiments of the invention, the archive nodes (110) are distributed computing devices. A distributed computing device may refer to functionality provided by a logical device that utilizes the computing resources of one or more separate and/or distinct computing devices. For example, in one or more embodiments of the invention, the archive nodes (110) may be distributed devices that include components distributed across any number of separate and/or distinct computing devices. In such a scenario, the functionality of the archive nodes (110) may be performed by multiple different physical computing devices without departing from the invention. For example, the archive nodes (110) may utilize virtualized computing resources of any number of physical computing devices to provide the functionality of the archive nodes (110).

The archive nodes (110) may provide data archive services for the data nodes (100). For example, the archive nodes (110) may store archives of data and provide copies of stored archives of data. For additional details regarding the archive nodes (110), refer to FIG. 1.3.

As discussed above, the data nodes (100) may implement data protection policies of a decentralized data protection system. FIG. 1.2 shows a diagram of data node A (100.2) in accordance with one or more embodiments of the invention. The other data nodes of FIG. 1.1 may be similar to data node A (100.2).

As noted above, data node A (100.2) may implement data protection policies of the decentralized data protection system of FIG. 1.1. To implement the data protection policies, the data node A (100.2) may include a data protection agent (102) and a persistent storage (104). Each component of data node A (100.2) is discussed below.

In one or more embodiments of the invention, the data protection agent (102) enforces data protection policies (104.2) on data stored in the persistent storage (104) and in other data nodes and/or archive nodes. To enforce the data protection policies (104.2), the data protection agent (102) may monitor the state of the decentralized data protection system, make a determination that the state of the decentralized data protection system no longer meets one or more requirements of the data protection policies (104.2), and takes action to conform the state of the decentralized data protection system in response to the determination. To conform the state of the decentralized data protection system, the data protection agent (102) may add or remove copies of data stored in data node A (100.2) and/or other nodes of the data protection system. In the event that copies of data are removed, metadata may be added that reflects the deletion of the copies of the data and/or the reason for such removal (e.g., copy is no longer necessary to meet requirements of the data protection policies). The data protection agent (102) may also comply with request from other data nodes for data deletion and/or storage of copies of data. To provide the aforementioned functionality of the data protection agent (102), the data protection agent (102) may perform all or a portion of the methods illustrated in FIGS. 3.1-3.6.

In one or more embodiments of the invention, the data protection agent (102) is a hardware device including circuitry. The data protection agent (102) may be, for example, a digital signal processor, a field programmable gate array, or an application specific integrated circuit. The data protection agent (102) may be other types of hardware devices without departing from the invention.

In one or more embodiments of the invention, the data protection agent (102) is implemented as computing code stored on a persistent storage that when executed by a processor performs the functionality of the data protection agent (102). The processor may be a hardware processor including circuitry such as, for example, a central processing unit or a microcontroller. The processor may be other types of hardware devices for processing digital information without departing from the invention. In other words, the data protection agent (102) may be implemented as an application that executes using hardware components of one or more computing devices.

In one or more embodiments of the invention, the persistent storage (104) is a storage device that stores data structures. The persistent storage (104) may be a physical or logical device. For example, the persistent storage (104) may include hard disk drives, solid state drives, tape drives, and other components to provide data storage functionality. Alternatively, the persistent storage (104) may be a logical device that utilizes the physical computing resources of other components to provide data storage functionality. In other words, the persistent storage (104) may be implemented as a virtualized storage.

In one or more embodiments of the invention, the persistent storage (104) stores local data (106), remote data (108), data protection policies (104.2), and a distributed data storage map (104.4). Each of these data structures is discussed below.

The local data (106) may be a data structure including information relating to data generated by the data node A (100.2). For example, the local data (106) may include a local data repository (106.2) that includes data generated by the data node A (100.2). The local data repository (106.2) may include any amount of data generated by the data node A (100.2). The local data (106) may also include local data metadata (106.4). The local data metadata (106.4) may include information relating to data stored in the local data repository (106.2).

As will be discussed in greater detail below, the data protection agent (102) may store copies of data stored in the local data repository (106.2) in other nodes and copies of data from other data nodes in the persistent storage (104) to meet requirements of the data protection policies (104.2).

The local data metadata (106.4) may include information indicating where the copies of the data are stored. For example, the information may include an identifier of each other data node that stores a copy of data from the local data repository (106.2). Such location information may be included in the local data metadata (106.4). By doing so, data node A (100.2) may be able to determine the locations of copies of data of the local data repository (106.2) using the local data metadata (106.4). For additional details regarding local data metadata, refer to FIG. 2.2.

The remote data (108) may be a data structure including information relating to copies of data obtained from other data nodes. For example, the remote data (108) may include a replica repository (108.4) that includes copies of data from other data nodes. Such copies may provide data redundancy in the decentralized data protection system. The remote data (108) may also include replica metadata (108.6).

As will be discussed in greater detail below, the data protection agent (102) may archive copies of data stored in the replica repository (108.4) and may delete the copies of the data stored in the replica repository (108.4) after storing the archive copies in archive nodes. The replica metadata (108.6) may include information that enables the data protection agent (102) to ensure that other nodes may be able to obtain copies of data that have been archived by the data protection agent (102). For additional details regarding replica metadata (108.6), refer to FIG. 2.1.

The data protection policies (104.2) may be a data structure including information regarding requirements of the decentralized data protection system. For example, the data protection policies (104.2) may specify: (i) the number of copies of data that must be stored in different data nodes during different periods of time, (ii) when data and copies of data should be archived, and/or (iii) actions that should be taken when nodes are unable to verify that the number of copies of the data are stored in different data nodes to meet the required number of copies to be stored in different data nodes during the different periods of time. The data protection policies (104.2) may specify additional, different, and/or fewer requirements of the decentralized data protection system without departing from the invention.

The distributed data storage map (104.4) may be a data structure that specifies where data and/or copies of data are stored in the decentralized data protection system. Each of the nodes of the decentralized data protection system may continuously advertise the data stored in each respective node to ensure that the distributed data storage map (104.4) that is maintained by each node is kept up-to-date. The distributed data storage map (104.4) may include information that enables the data protection agent (102) to ascertain the locations where data and/or copies of data are stored.

In one or more embodiments of the invention, the distributed data storage map (104.4) is implemented as a distributed hash table. For example, the distributed data storage map (104.4) may map hashes of data to location information for the data. Thus, the location of data may be obtained using a hash of the data. The distributed data storage map (104.4) may be implemented using different types of data structures without departing from the invention.

While the persistent storage (104) illustrated in FIG. 1.2 is shown as including a limited number of data structures, the persistent storage (104) may include additional, fewer, and/or different data structures without departing from the invention. Further, while the data structures are illustrated as being separate, the data included in the data structures stored in the persistent storage (104) may be stored as a single data structure, may include additional information than that discussed above, and may be stored in different locations without departing from the invention.

As noted above, data nodes may store archives of data in archive nodes. FIG. 1.3 shows a diagram of archive node A (110.2) in accordance with one or more embodiments of the invention. The other archive nodes of FIG. 1.1 may be similar to archive node A (110.2).

As noted above, archive node A (110.2) may provide data archival services to data nodes. To provide this functionality, the archive node A (110.2) may include an archive agent (112) and a persistent storage (114). Each component of archive node A (110.2) is discussed below.

In one or more embodiments of the invention, the archive agent (112) provides archive services to data nodes. For example, the archive agent (112) may obtain data from data nodes and store the data in the persistent storage (114). The archive agent (112) may also provide stored copies of data from the persistent storage (114) in response to requests from data nodes and/or other entities.

In one or more embodiments of the invention, the archive agent (112) is a hardware device including circuitry. The archive agent (112) may be, for example, a digital signal processor, a field programmable gate array, or an application specific integrated circuit. The archive agent (112) may be other types of hardware devices without departing from the invention.

In one or more embodiments of the invention, the archive agent (112) is implemented as computing code stored on a persistent storage that when executed by a processor performs the functionality of the archive agent (112). The processor may be a hardware processor including circuitry such as, for example, a central processing unit or a microcontroller. The processor may be other types of hardware devices for processing digital information without departing from the invention.

In one or more embodiments of the invention, the persistent storage (114) is a storage device that stores data structures. The persistent storage (114) may be a physical or logical device. For example, the persistent storage (114) may include hard disk drives, solid state drives, tape drives, and/or other components to provide data storage functionality. Alternatively, the persistent storage (114) may be a logical device that utilizes the physical computing resources of other components to provide data storage functionality.

In one or more embodiments of the invention, the persistent storage (114) stores an archived data repository (114.2). The archived data repository (114.2) may store data from data nodes. For example, the data nodes may send archives of data to the archive agent (112) and the archive agent (112) may store archives of the data in the archived data repository (114.2). By doing so, the storage space of data nodes may be freed while copies of data that was present in the storage space of the data nodes are stored in the archive nodes.

While the persistent storage (114) illustrated in FIG. 1.3 is shown as including a limited number of data structures, the persistent storage (114) may include additional, fewer, and/or different data structures without departing from the invention. Further, while the data structures are illustrated as being separate, the data included in the data structures stored in the persistent storage (114) may be stored as a single data structure, may include additional information than that discussed above, and may be stored in different locations without departing from the invention.

To further clarify aspects of embodiments of the invention, diagrams of data structures utilized by nodes of the decentralized data protection system of FIG. 1.1 are illustrated in FIGS. 2.1-2.2.

FIG. 2.1 shows a diagram of replica metadata (108.6) in accordance with one or more embodiments of the invention. As noted above, replica metadata (108.6) may enable a data node to orchestrate retrieval of a copy of data by another data node. Replica metadata (108.6) may include any number of entries (e.g., 200, 202). Each of the entries may be associated with an archive of a copy data stored in an archive node. The copy of the data may have been deleted from a replica repository.

Metadata entry A (200) may include information regarding a replica of local data stored in different data node. For example, metadata entry A (200) may include a data association (200.2) that associates the replica of the local data with the node that includes the local data. For example, the data association (200.2) may be an identifier of the other data node that hosts the local data associated with the replica in the replica repository. The data association may also include an identity of the particular replica in the replica repository that is a copy of the local data in another data node.

Metadata entry A (200) may also include a label (200.4). The label (200.4) may specify a state of the replicas of the local data. For example, if the replica is present in the replica repository, the label (200.4) may indicate that the replica is present. In another example, if the replica in the replica repository has been deleted but a replica in another data node and/or the local data associated with the replica is still available, the label (200.4) may indicate that a copy of the local data is available but is not present on this data node. In such a scenario, the label (200.4) may further include access information that may be used by the data node and/or another entity to obtain a copy of the replica in another data node and/or a copy of the local data from another node. Thus, even if the replica is not present on the data node, a copy of the replica may still be obtained using information included in the metadata entry A (200).

In a further example, the label (200.4) may indicate that the replica has been purged. Being purged indicates that no replica or the local data is available anywhere in the system. In such a scenario, metadata entry A (200) may also include policy information (200.6). The policy information (200.6) may include information regarding the conditions that caused the replica to be purged. For example, the policy information (200.6) may specify that the age of the local data upon which the replica was based exceeded a storage lifetime for a data protection policy associated with the local data. In other words, a data protection policy may have required that the local data and/or all replicas be deleted. Such policies may be in place to eliminate aged data for the purpose of freeing storage space of the system.

Each entry of the replica metadata (108.6) may include information similar to metadata entry A (200) but for pieces of replica data. Thus, the replica metadata (108.6) may include an entry for each piece of replica data stored in a replica repository.

FIG. 2.2 shows a diagram of local data metadata (104.6) in accordance with one or more embodiments of the invention. As noted above, local data metadata (104.6) may track where copies of data are stored across the decentralized data protection system. The local data metadata (104.6) may include any number of entries (e.g., 220, 222). Each of the entries may be associated with data stored in a local data repository.

Local data metadata entry A (220) includes information that may be used to track where copies of data associated with the local data metadata entry A (220) are stored. Local data metadata entry A (220) may include a data identifier (220.2) that identifies the data associated with the entry. For example, the data identifier (220.2) may be an identifier of the data within a local data repository such as a file name or uniform resource identifier.

Local data metadata entry A (220) may also include replication information (220.4). The replication information (220.4) may specify where copies of the data are stored. For example, the replication information (220.4) may include identifiers of other data nodes that store copies of the data associated with the local data metadata entry A (220).

Each entry of the local data metadata (104.6) may include information similar to local data metadata entry A (220) but for other pieces of local data. Thus, the local data metadata (104.6) may include an entry for each portion of data stored in a local data repository.

As discussed above, components of the system of FIG. 1.1 may perform methods for managing a decentralized data protection system. FIGS. 3.1-3.6 show methods in accordance with one or more embodiments of the invention that may be performed by components of the system of FIG. 1.1. Any of the steps show in FIGS. 3.1-3.4 may be omitted, performed in a different order, and/or performed in parallel or partially overlapping manner with respect to other steps without departing from the invention.

FIG. 3.1 shows a flowchart of a method in accordance with one or more embodiments of the invention. The method depicted in FIG. 3.1 may be used to enforce data protection policies in accordance with one or more embodiments of the invention. The method shown in FIG. 3.1 may be performed by, for example, data nodes (e.g., 100, FIG. 1.1). Other components of the system illustrated in FIG. 1.1 may perform the method of FIG. 3.1 without departing from the invention.

In step 300, a data protection strategy change event for data is identified.

In one or more embodiments of the invention, the data protection strategy change event is an event specified by data protection policies. For example, the data protection strategy change event may be related to the age of data. The data protection policies may specify different protection strategies for data of different ages. The data protection policies may specify any type and quantity of policies that specify data protection strategy change events.

In one or more embodiments of the invention, the data protection strategy change event is identified by monitoring of local data by the data node. That is, the data node may monitor an age of the local data and may identify the data protection strategy change event when the age of the data changes the data protection strategy that is to be applied to the data. The data protection strategy change event may be identified via other methods without departing from the invention.

For example, consider a scenario in which a data protection policy for data specifies three separate protection strategies. The first data protection strategy may be for the first six months of life of the data, the second data protection strategy may be for six to 12 months of the data's life, and the third strategy may be for greater than 12 months of the data's life. The first data protection strategy may require that three copies of the data be stored in three separate, respective data nodes. The second data protection strategy may require that only a single copy of the data be stored. The third data protection strategy may specify that the data must be purged, e.g., deleted from all data nodes. In this scenario, the data protection strategy applied to the data changes over time and, as the data ages, each of the different data protection strategies may be applied to the data.

In step 302, it is determined whether the data protection strategy change trigger event is a scale down event or a purge.

A scale down may be a data protection strategy that requires that the number of duplicative copies of data required to be stored across any number of data nodes be reduced from a previously required number. For example, the number of required copies may be reduced from 3 to 1. The reduction may be a different number without departing from the invention.

A purge may be a data protection strategy that requires all copies of the data be deleted. For example, the data protection strategy may require that all replicas of the data be deleted and that the copy of the data in local data be deleted.

The type of the data protection strategy change trigger event may be determined based on the content of the data protection policy that triggered the event. For example, the data protection policy that was triggered may specify whether the event is a scale down or a purge event.

If the data protection strategy change trigger event is a scale down, the method may proceed to Step 304. If the data protection strategy change trigger event is a purge, the method may proceed to Step 308.

While Step 302 has been described with respect to two types of event, a method in accordance with embodiments of the invention may determine a course of action for proceed with respect to any number of different types of data protection strategy change trigger events without departing from the invention. For example, a data protection strategy change trigger event may be the triggering of a data protection strategy that requires an increase in the number of copies of data to be stored across the data nodes. A corresponding method for proceeding may be provided for any number of different types of trigger events without departing from the invention.

In step 304, the state of replicas of the data in other entities is determined.

In one or more embodiments of the invention, the state of the replicas in the other entities is determined by sending verification requests to each data node that has advertised that it is storing a replica of the data. To identify these data nodes, a distributed data storage map (104.4, FIG. 1.2) may be used to identify the data nodes. Upon receipt of the status requests, each of the data nodes may perform the method shown in FIG. 3.2, or a different method. By doing so, corresponding responses from each of the data nodes that allegedly hosts a replica of the data may be obtained. The responses may specify whether each data nodes has a replica of the data and/or has access to a replica of the data (e.g., has information that may be used to access the replica in, for example, an archive node).

In step 306, the number of replicas is reduced based on a scale down policy by sending scale down command(s).

In one or more embodiments of the invention, the number of scale down commands is selected based on the number of data nodes that responded that the status of the replica is acceptable in Step 304 and the number of copies of the data that should be maintained as specified by the scale down. The number of scale down commands may be the difference between the number of data nodes that responded that the status of the replica is acceptable in Step 304 and the number of copies of the data that should be maintained as specified by the scale down. For example, if the number of data nodes that responded that the status of the replica is acceptable in Step 304 is 5 and the scale down specifies that only 3 copies of the data should be maintained, the number of scale down commands may be selected as 2 (e.g., 5−3=2).

The data nodes that receive such scale down commands may be selected via any method without departing from the invention. For example, the data nodes may be randomly selected from the data nodes that responded that the state of the replica is acceptable. In another example, data nodes that responded that the state of the replica is acceptable but that don't actually have a replica of the data may be preferentially selected over data nodes that responded that the state of the replica is acceptable and that do have a replica of the data. The method of selection employed may require different amounts of information to be sent between the data nodes. Consequently, the method of selection employed by the data nodes may be selected based on the availability of communication bandwidth between the data nodes. In some cases, the method of selection may be dynamically changed based on the communication bandwidth available between the data nodes (e.g., during periods of low communication bandwidth availability a random selection process may be employed while during periods of high communication bandwidth availability a more data transfer intensive method selection process may be employed).

The data nodes may take action in response to receiving the scale down commands. For example, the data nodes may perform the method illustrated in FIG. 3.5. The data nodes may perform other actions than the method shown in FIG. 3.5 in response to receiving a scale down command without departing from the invention.

The method may end following Step 306.

Returning to Step 302, the method may proceed to Step 308 following Step 302 if the data protection strategy change trigger event is a purge.

In Step 308, a global deletion command is sent to all entities storing a replica of the data. Sending the global deletion command may result in a global deletion event, e.g., a purge.

All of the entities may be the data nodes storing replicas of the data. The data nodes may be identified using a distributed data storage map.

The data nodes may take action in response to receiving the global deletion command. For example, the data nodes may perform the method illustrated in FIG. 3.6. The data nodes may perform other actions than the method shown in FIG. 3.6 in response to receiving a global deletion command without departing from the invention.

The method may end following step 308.

Using the method illustrated in FIG. 3.1, a system in accordance with embodiments of the invention may provide data protection strategy enforcement for data across any number of data nodes of a distributed system. Consequently, the distributed system may be data protection strategy compliant.

FIG. 3.2 shows a flowchart of a method in accordance with one or more embodiments of the invention. The method depicted in FIG. 3.2 may be used to respond to a data state verification request in accordance with one or more embodiments of the invention. The method shown in FIG. 3.2 may be performed by, for example, data nodes (e.g., 100, FIG. 1.1). Other components of the system illustrated in FIG. 1.1 may perform the method of FIG. 3.2 without departing from the invention.

In step 320, a request to verify the state of a copy of data, i.e., a replica of the data, is obtained. The copy of the data may be stored in a replica repository. In other words, the copy may be a replica of local data stored in another data node. The another data node storing the local data may have sent the request. The replica repository may be a portion of a data node that received the request.

In step 322, is determined whether the copy of the data is stored in the replica repository. In other words, it is determined whether a replica of the local data implicated by the request is stored locally in the data node, e.g., in a replica repository of the data node that received the request of step 320. If the copy of the data is stored in the replica repository, the method may proceed to step 324. If the copy of the data is not stored in the replica repository, the method may proceed to step 330.

In step 324, the state of the copy of the data in the replica repository is determined. That is, it is determined whether the copy of the data should be in the replica repository. If the copy of the data is stored in the replica repository, the state is determined as acceptable. If the copy of the data is not stored in the replica repository, the state is determined as unacceptable. For example, data loss may have caused the copy of the data to not be stored in the replica repository even if it should be (e.g., metadata associated with the replica indicates that the data is present and/or no previous action should have resulted in deletion of the replica) stored in the replica repository.

In step 326, it is determined whether the state of the copy of the data is acceptable. If the state is acceptable, the method may proceed to step 328. If the state is not acceptable, the method may proceed to step 332.

In step 328, a notification is sent that indicates that the state of the copy of the data is acceptable. The notification may be sent to a requesting entity implicated by the request of step 320.

The method may end following step 328.

Returning to step 326, the method may proceed to step 332 if the state is unacceptable.

In step 332, a notification is sent that indicates that the copy of the data is unacceptable. For example, the notification may indicate that the copy of the data is unavailable.

The method may end following step 332.

Returning to step 322, the method may proceed to step 330 if the copy of the data is not stored in the replica repository. That is, if the copy of the data is not expected to be stored in the replica repository because the copy of the data was, for example, previously removed for data protection strategy compliance purposes.

In step 330, it is determined whether metadata associated with the replica indicates that the data is available elsewhere. For example, the metadata may indicate that the replica was deleted from local storage, e.g., a replica repository, but that another copy of the data is stored in another data node.

If it is determined that a copy of the data is available elsewhere, the method may proceed to step 328. If it is determined that the data is not available elsewhere, the method may proceed to step 332. Thus, following step 330, a notification may be sent that indicates that the state of the copy of the data is acceptable even though no local copy of the data exists on the data node (but is available in archive nodes and/or other data nodes) that received the request of step 320. In contrast, if no copies of the data are available anywhere, the data node may send a notification indicating that the state of the data is unavailable, i.e., unacceptable.

Using the method illustrated in FIG. 3.2, a system in accordance with embodiments of the invention may respond to state verification requests. Such determinations may be used during the process of enforcing data protection policies and corresponding data protection strategies.

FIG. 3.3 shows a flowchart of a method in accordance with one or more embodiments of the invention. The method depicted in FIG. 3.3 may be used to archive data in accordance with one or more embodiments of the invention. The method shown in FIG. 3.3 may be performed by, for example, data nodes (e.g., 100, FIG. 1.1). Other components of the system illustrated in FIG. 1.1 may perform the method of FIG. 3.3 without departing from the invention.

In step 340, request to archive a copy of data stored in replica repositories is obtained.

In one or more embodiments of the invention, the request to archive the copy of the data is obtained from a data node that generated the data.

In step 342, an archive of the copy of the data is generated and the archive is sent to an archive node.

In one or more embodiments of the invention, generating the archive of the copy of the data reduces the size of the copy of the data. For example, archive of the copy of the data may compress or de-duplicate the copy of the data against data stored in the archive node.

In step 344, a replica metadata entry associated with the copy of the data is generated. As noted above, a replica metadata entry may include information that identifies storage location of the archive as well as the copy of the data which was used to generate the archive.

In step 346, the copy of the data is deleted from the replica repository.

In step 348, after deleting the copy of the data, it is advertised that the copy of the data is stored in the replica repository.

In one or more embodiments of the invention, advertising that the copy of the data is stored in the replica repository is performed by maintaining an entry of a distributed data storage map associated with the copy of the data. That is, the advertising may cause other data nodes to act as though the copy of the data is still stored in the data node.

The method may end following step 348.

Using the method illustrated in FIG. 3.3, a system in accordance with embodiments of the invention may archive copies of data in a manner compatible with a decentralized data protection system and/or data protection policies of the system.

FIG. 3.4 shows a flowchart of a method in accordance with one or more embodiments of the invention. The method depicted in FIG. 3.4 may be used to respond to requests for copies of data in accordance with one or more embodiments of the invention. The method shown in FIG. 3.4 may be performed by, for example, data nodes (e.g., 100, FIG. 1.1). Other components of the system illustrated in FIG. 1.1 may perform the method of FIG. 3.4 without departing from the invention.

In step 360, a request for a copy of data is obtained from a requesting entity.

In one or more embodiments of the invention, the copy of the data was previously stored in the data node.

In step 362, it is determined whether the copy of the data is stored in a replica repository of the data node. If the copy of the data is stored in the replica repository, the method may proceed to step 364. If the copy of the data is not stored in the replica repository, the method may proceed to step 366.

In step 364, the copy of the data from the replica repository is provided in response to the request.

The method may end following step 364.

Returning to step 362, the method may proceed to step 366 following step 362.

In step 366, retrieval of the copy of the data is orchestrated for the requesting entity.

In one or more embodiments of the invention, retrieval of the copy of the data is orchestrated by obtaining an archive of the copy of the data from an archive node. Either the archive may be provided, or the copy of the data may be generated using the archive and the copy of the data may be provided in response to the request.

In one or more embodiments of the invention, retrieval of the copy of the data is orchestrated by sending replica metadata associated with the copy of the data in response to the request. The replica metadata may include information that enables an archive of the copy of the data to be retrieved from an archive node.

The method may end following step 366.

Using the method illustrated in FIG. 3.4, a system in accordance with embodiments of the invention may enable a node to provide a copy of data that may or may not have been previously archived in a manner that is compatible with a decentralized data protection system.

FIG. 3.5 shows a flowchart of a method in accordance with one or more embodiments of the invention. The method depicted in FIG. 3.5 may be used to respond to a scale down command in accordance with one or more embodiments of the invention. The method shown in FIG. 3.5 may be performed by, for example, data nodes (e.g., 100, FIG. 1.1). Other components of the system illustrated in FIG. 1.1 may perform the method of FIG. 3.5 without departing from the invention.

In Step 370, a scale down command for data is obtained.

The scale down command may be received from another data node. For example, the scale down command may be sent by another data node when a data protection strategy changes and compliance with the new data protection strategy requires storing fewer copies of data across any number of data nodes.

In step 372, the data is deleted from a replica repository. In other words, a local copy of the data stored as a replica of local data of another data node is deleted. The scale down command may specify the data to be deleted as part of the scale down command.

If a copy of the data is not present in the replica repository, step 372 may be omitted. For example, if the copy of the data was previously present but had been deleted prior to receiving the scale down command, step 372 may be omitted.

In step 374, metadata associated with the deleted data is updated to specify: (i) an identifier of the data and (ii) a label indicating that the data in the replica repository has been deleted. The metadata may also be updated to indicate that copies of the data may be available from other nodes if such copies exist.

In step 376, it is advertised that the copy of the data is stored in the replica repository after deleting the copy of the data. In other words, the data node may continue to advertise that the copy of the data exists even though it does not actually exist. The data node may perform such advertisements by including appropriate information in a distributed data storage map (104.4, FIG. 1.2).

The method may end following step 376.

Using the method illustrated in FIG. 3.5, a system in accordance with embodiments of the invention may respond to scale down commands in a manner that enables other data nodes to continue to comply with data protection strategies.

FIG. 3.6 shows a flowchart of a method in accordance with one or more embodiments of the invention. The method depicted in FIG. 3.6 may be used to respond to a global deletion command in accordance with one or more embodiments of the invention. The method shown in FIG. 3.6 may be performed by, for example, data nodes (e.g., 100, FIG. 1.1). Other components of the system illustrated in FIG. 1.1 may perform the method of FIG. 3.6 without departing from the invention.

In Step 380, a global deletion command for data is obtained.

The global deletion command may be received from another data node. For example, the global deletion command may be sent by another data node when a data protection strategy changes and compliance with the new data protection strategy requires eliminating all copies of the data from all of the data nodes. Such commands may be sent when a data protection strategy requires deletion of such copies of data to free storage resources of the data nodes. By doing so, a distributed data protection system may have access to additional computational resources.

In step 382, the data is deleted from a replica repository. In other words, a local copy of the data stored as a replica of local data of another data node is deleted. The global deletion command may specify the data to be deleted as part of the global deletion command.

If a copy of the data is not present in the replica repository, step 382 may be omitted. For example, if the copy of the data was previously present but had been deleted prior to receiving the global deletion command, step 382 may be omitted.

In step 384, metadata associated with the deleted data is updated to specify: (i) an identifier of the data, (ii) a label indicating that the data in the replica repository has been deleted, and (iii) retention information associated with the data (e.g., information regarding a data protection policy that caused the data to be deleted due to, for example, an age of the data). By including such information in the metadata, an entity that obtains the metadata may be alerted to the fact that copies of the data are not available anywhere in the decentralized data protection system and the reason for removal of the data.

In step 386, a distributed data storage map is updated based on the global deletion of the data after the copy of the data is deleted. In other words, the global data storage map may be updated to reflect that the data has been globally deleted.

The method may end following step 386.

Using the method illustrated in FIG. 3.6, a system in accordance with embodiments of the invention may respond to global deletion commands in a manner that enables other data nodes to continue to comply with data protection strategies.

To further clarify embodiments of the invention, a non-limiting example is provided in FIGS. 4.1-4.5. FIGS. 4.1-4.5 illustrate a system similar to that of FIG. 1.1. For the sake of brevity, only a limited number of components of the system of FIG. 1.1 are illustrated in FIGS. 4.1-4.5.

EXAMPLE

Consider a scenario as illustrated in FIG. 4.1 in which a decentralized data protection system includes three data nodes (e.g., 400, 410, 420). At a first point in time, data node A (400) stores data (400.2). To provide data redundancy, copies of the data (410.2, 420.2) are stored in data node B (410) and data node C (420).

Three copies of the data are stored across the three data nodes to comply with a first data protection strategy that requires three copies of the data to be stored in three separate data nodes for the first 6 months of the data's life. A data protection policy that specifies the first data protection strategy also specifies a second data protection strategy that requires that only a single copy of the data be stored between 6 and 12 months of the data's life. The data protection policy also specifies a third data protection strategy that requires that the data be purged after 12 months of life. The data protection policy aims to strike a balance between consuming data storage resources and data redundancy.

After 6 months, the age of the data (400.2) triggers a change in data protection strategy from the first to the second data protection strategy. To enforce compliance with the second data protection strategy, data node A (400) sends a scale down request (402) to data node B (410) and data node C (420) as shown in FIG. 4.2.

In response to receiving the scale down request, data node B deletes the copy of data (410.2) and updates metadata (410.4) associated with the now-deleted copy of the data as illustrated in FIG. 4.3. The metadata (410.4) is updated to reflect that the data is no longer present but that it is still available elsewhere, i.e., data node A (400). Data node C (420) similarly removes the data and updates its metadata (420.4) associated with the now-deleted copy of the data (420.2).

After 12 months, the age of the data (400.2) triggers a second change in data protection strategy from the second to the third data protection strategy. To enforce compliance with the third data protection strategy, data node A (400) sends a global deletion request (404) to data node B (410) and data node C (420) as shown in FIG. 4.4.

In response to receiving the scale down request, data node B updates metadata (410.4) based on the global deletion of the data to obtain global deletion metadata (410.6) as illustrated in FIG. 4.5. The global deletion metadata (410.6) indicates that the data is no longer available on any node and that triggering of the data protection policy caused the data to be deleted globally. Data node C (420) similarly updates its metadata (420.4, FIG. 4.4) to also obtain global deletion metadata (420.6) associated with the now-deleted copy of the data (420.2, FIG. 4.1).

Like the other data nodes, data node A (400) deletes the data (400.2, FIG. 4.1) and updates associated metadata to obtain global deletion metadata (400.6) that specifies that the data is no longer deleted and that it was deleted based upon a data protection strategy specified by a data protection strategy. Thus, it may be determined, after deletion of the data and the copies of the data, that the data was deleted due to compliance with a data protection policy (rather than for other reasons) by accessing the metadata stored in any of the data nodes that originally-stored the data or a copy of the data.

End of Example

Any of the components of FIG. 1.1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may improve the field of decentralized storage. Specifically, embodiments of the invention may improve decentralized stored systems by improving the tolerance of such systems to changes in network connectivity. Embodiments of the invention may improve tolerance to changes in network activity by performing specific methods for storing, retrieving, and archiving data in such a system.

For example, embodiments of the invention may provide for the storage of metadata on a variety of data nodes that enables other data nodes to identify a state of data throughout a decentralized data storage system. By doing so, changes in network connectivity across the network may have little impact on the ability of the distributed system to effectively manage data throughout the system.

Thus, embodiments of the invention may address problems that arise due to the technological nature of decentralized data protection systems. For example, decentralized data protection systems that rely on redundant storage of data for data integrity purposes are susceptible to system failure due to loss of network connectivity between nodes of the decentralized system. Embodiments of the invention may improve decentralized data protection systems by improving their tolerance to changes in or loss of network connectivity between nodes of the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions, e.g., computer readable program code, executed by one or more processors of the data management device. Further, such instructions may correspond to computer readable instructions, e.g., computer readable program code, that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A node for use in a data management system, comprising:
   a persistent storage that stores data; and
   a data protection agent programmed to:
      make an identification of a data protection strategy change event for the data;
      in response to the identification:
         make a determination that the data protection strategy change event is a scale down event;
         in response to the determination:
            identify a number of replicas of the data in other nodes that are in a predetermined state;
            make a second determination that the number of the replicas of the data in the other nodes that are in the predetermined state exceeds a threshold specified by a data protection policy associated with the data protection strategy change event; and
            reduce the number of replicas that exceed the threshold to be less than the threshold in response to the second determination.

2. The node of claim 1, wherein reducing the number of replicas that exceed the threshold to be less than the threshold comprises:
   sending a scale down command to at least one of the number of the replicas that exceeds the threshold,
   wherein the scale down command specifies the data.

3. The node of claim 1, wherein the data protection agent is further programmed to:
   make an second identification of a second data protection strategy change event for the data;
   in response to the second identification:
      make a third determination that the second data protection strategy change event is a global deletion event;
      in response to the third determination:
         identify a portion of the other nodes that advertise that each respective node of the portion of the nodes stores a replica of the data; and
         remove all replicas of the data from the identified portion of the other nodes.

4. The node of claim 3, wherein removing all replicas of the data from the identified portion of the other nodes:
   sending a global deletion request to each of the nodes of the identified portion of the other nodes.

5. The node of claim 1, wherein the data protection agent is further programmed to:
   obtain a state verification request for a state of second data;
   make a third determination that the second data is stored in the persistent storage;
   indicate that the state is acceptable based on the third determination and in response to the state verification request.

6. The node of claim 5, wherein the data protection agent is further programmed to:
   obtain a second scale down request for the second data;
   in response to obtaining the second scale down request:
      delete the second data to obtain deleted second data; and
      update metadata associated with the deleted second data to specify:
         an identifier of the second data, and
         that the second data is available; and
      advertise that the second data is available after deleting the second data.

7. The node of claim 6, wherein the data protection agent is further programmed to:
   after deleting the second data:
      obtain a second state verification request for the state of the second data;
      make a fourth determination that the second data is not stored in the persistent storage in response to obtaining the second state verification request;
      make a fifth determination that the updated metadata associated with the deleted second data specifies that the second data is available in response to the fourth determination; and
      indicate that the state is acceptable based on the fifth determination and in response to the second state verification request.

8. A method for managing a node in a data management system, comprising:
   making an identification of a data protection strategy change event for data in a persistent storage of the node;
   in response to the identification:
      making a determination that the data protection strategy change event is a scale down event;
      in response to the determination:
         identifying a number of replicas of the data in other nodes that are in a predetermined state;
         making a second determination that the number of the replicas of the data in the other nodes that are in the predetermined state exceeds a threshold specified by a data protection policy associated with the data protection strategy change event; and
         reducing the number of replicas that exceed the threshold to be less than the threshold in response to the second determination.

9. The method of claim 8, wherein reducing the number of replicas that exceed the threshold to be less than the threshold comprises:
   sending a scale down command to at least one of the number of the replicas that exceeds the threshold,
   wherein the scale down command specifies the data.

10. The method of claim 8, further comprising:
   making a second identification of a second data protection strategy change event for the data;
   in response to the second identification:
      making a third determination that the second data protection strategy change event is a global deletion event;
      in response to the third determination:
         identifying a portion of the other nodes that advertise that each respective node of the portion of the nodes stores a replica of the data; and
         removing all replicas of the data from the identified portion of the other nodes.

11. The method of claim 10, wherein removing all replicas of the data from the identified portion of the other nodes:
   sending a global deletion request to each of the nodes of the identified portion of the other nodes.

12. The method of claim 8, further comprising:
   obtaining a state verification request for a state of second data;
   making a third determination that the second data is stored in the persistent storage;

indicating that the state is acceptable based on the third determination and in response to the state verification request.

13. The method of claim 12, further comprising:
obtaining a second scale down request for the second data;
in response to obtaining the second scale down request:
 deleting the second data to obtain deleted second data; and
 updating metadata associated with the deleted second data to specify:
  an identifier of the second data, and
  that the second data is available; and
advertise that the second data is available after deleting the second data.

14. The method of claim 13, further comprising:
after deleting the second data:
 obtaining a second state verification request for the state of the second data;
 making a fourth determination that the second data is not stored in the persistent storage in response to obtaining the second state verification request;
 making a fifth determination that the updated metadata associated with the deleted second data specifies that the second data is available in response to the fourth determination; and
 indicating that the state is acceptable based on the fifth determination and in response to the second state verification request.

15. A non-transitory computer readable medium comprising computer readable program code, which when executed by a computer processor enables the computer processor to perform a method for managing a node in a data management system, the method comprising:
 making an identification of a data protection strategy change event for data in a persistent storage of the node;
 in response to the identification:
  making a determination that the data protection strategy change event is a scale down event;
  in response to the determination:
   identifying a number of replicas of the data in other nodes that are in a predetermined state;
   making a second determination that the number of the replicas of the data in the other nodes that are in the predetermined state exceeds a threshold specified by a data protection policy associated with the data protection strategy change event; and
   reducing the number of replicas that exceed the threshold to be less than the threshold in response to the second determination.

16. The non-transitory computer readable medium of claim 15, wherein reducing the number of replicas that exceed the threshold to be less than the threshold comprises:
 sending a scale down command to at least one of the number of the replicas that exceeds the threshold, wherein the scale down command specifies the data.

17. The non-transitory computer readable medium of claim 15, wherein the method further comprises:
 making a second identification of a second data protection strategy change event for the data;
 in response to the second identification:
  making a third determination that the second data protection strategy change event is a global deletion event;
  in response to the third determination:
   identifying a portion of the other nodes that advertise that each respective node of the portion of the nodes stores a replica of the data; and
   removing all replicas of the data from the identified portion of the other nodes.

18. The non-transitory computer readable medium of claim 17, wherein removing all replicas of the data from the identified portion of the other nodes:
 sending a global deletion request to each of the nodes of the identified portion of the other nodes.

19. The non-transitory computer readable medium of claim 15, wherein the method further comprises:
 obtaining a state verification request for a state of second data;
 making a third determination that the second data is stored in the persistent storage;
 indicating that the state is acceptable based on the third determination and in response to the state verification request.

20. The non-transitory computer readable medium of claim 19, wherein the method further comprises:
 obtaining a second scale down request for the second data;
 in response to obtaining the second scale down request:
  deleting the second data to obtain deleted second data; and
  updating metadata associated with the deleted second data to specify:
   an identifier of the second data, and
   that the second data is available; and
 advertise that the second data is available after deleting the second data.

* * * * *